US005772954A

United States Patent [19]
Edenfield

[11] Patent Number: 5,772,954
[45] Date of Patent: Jun. 30, 1998

[54] COMBINED PREHEAT AND CUTTING OXYGEN VALVE FOR CUTTING TORCHES

[75] Inventor: Randy C. Edenfield, Flowery Branch, Ga.

[73] Assignee: The Lincoln Electric Company, Cleveland, Ohio

[21] Appl. No.: 722,892

[22] Filed: Sep. 27, 1996

[51] Int. Cl.⁶ ..................................................... B23K 7/00
[52] U.S. Cl. .............................. 266/48; 239/407; 239/414
[58] Field of Search ................................. 148/48; 239/407, 239/413, 414, 415

[56] References Cited

U.S. PATENT DOCUMENTS

| | | |
|---|---|---|
| 1,940,343 | 12/1933 | Bennett et al. . |
| 2,989,242 | 6/1961 | Turak ........................................ 239/414 |
| 3,354,930 | 11/1967 | Hach . |
| 4,022,441 | 5/1977 | Turney . |
| 4,194,535 | 3/1980 | Galland et al. .......................... 239/414 |
| 4,248,384 | 2/1981 | Zwicker . |
| 4,409,002 | 10/1983 | Zwicker . |
| 4,509,689 | 4/1985 | Kuo . |

FOREIGN PATENT DOCUMENTS 136850  7/1946  Australia ................................ 239/415

*Primary Examiner*—John Sheehan
*Attorney, Agent, or Firm*—Vickers, Daniels & Young

[57] ABSTRACT

The valve body of a gas torch is provided with a combined preheat oxygen and cutting oxygen valve unit in which the respective valves are coaxially interengaged and mounted in a single bore provided therefor in the valve body. The preheat oxygen valve is rotatable relative to the bore to control the flow of preheat oxygen to the torch tip, and the cutting oxygen valve is axially displaceable relative to the preheat oxygen valve to control the flow of cutting oxygen to the torch tip. The preheat oxygen valve includes an operating knob by which the valve is rotated and which knob is disposed beneath a pivotal operating lever by which the cutting oxygen valve is operated.

35 Claims, 3 Drawing Sheets

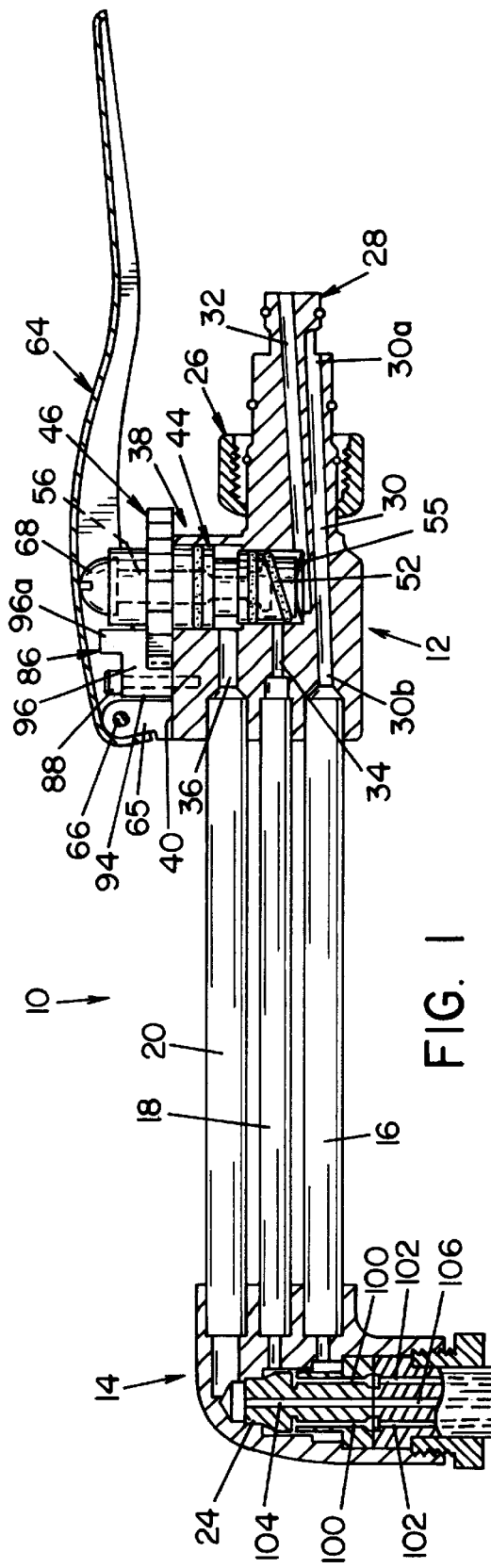
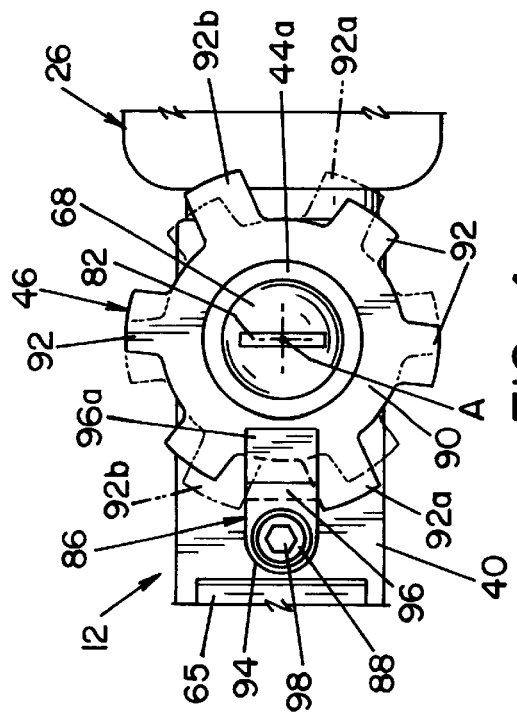

COMBINED PREHEAT AND CUTTING OXYGEN VALVE FOR CUTTING TORCHES

BACKGROUND OF THE INVENTION

This invention relates to the art of gas burning torches and more particularly to an improved preheat oxygen and cutting oxygen valve arrangement for a cutting torch.

Fuel gas-oxygen cutting torches are of course well known and generally comprise a torch head having outlet passages communicating with a torch tip through which a combustible gaseous mixture flows and is ignited and directed toward a workpiece. The torch further includes fuel gas and oxygen supply lines connected to corresponding sources of fuel gas and oxygen, and valves are provided for controlling the flow of fuel gas and oxygen to the torch head. More particularly in this respect, such torches have a preheat mode of operation in which the fuel gas and preheat oxygen are metered through corresponding valves and combine in a mixer portion of the torch to provide a combustible mixture which flows to the torch head outlet and torch tip where the mixture is ignited to form a preheat flame which is used to heat a workpiece to a temperature which will support combustion. The torches also have a cutting mode of operation wherein, following a preheat operation, cutting oxygen is metered through a corresponding valve and supplied to the torch tip separate from the preheat combustible mixture to flow from the tip and cut the heated workpiece. As is also well known, the preheat oxygen and preheat fuel gas valves are manually adjustable enabling the torch operator to adjust the volume and mixture of the preheat gases to obtain a desired heating flame at the torch tip, and the cutting oxygen valve, which can be hand lever or thumb operated, enables the operator to control the flow of cutting oxygen to the tip for cutting the heated workpiece.

Generally, the cutting oxygen control valve is mounted in a valve body which is connected to the torch head through fuel gas, preheat oxygen and cutting oxygen supply tubes. The valve body is connected to sources of oxygen and fuel gas, and the preheat oxygen and preheat fuel gas control valves are either mounted on the valve body or on a handle adapted to be attached to the valve body and which in turn is connected to the sources of oxygen and fuel gas. In any event, as shown in in U.S. Pat. No. 4,022,441 to Turney and U.S. Pat. No. 4,409,002 to Zwicker for example, cutting torches heretofore provided require structurally separate valve units for controlling the flow of preheat oxygen and for controlling the flow of cutting oxygen. Moreover, separate valves have corresponding valve actuators which extend or project from the valve body or handle in different directions making it somewhat cumbersome for the operator to manipulate the valves. In this respect, depending on the direction of extension of the valve actuators relative to the valve body or handle, valve manipulation can be difficult for one or the other of right and left hand persons operating the torch. Moreover, the valve locations and orientations can encumber handling of the torch in general. Still further, the separate valve units require multiple bores in the valve body or handle whereby the manufacturing and assembly times and thus costs are undesirably high.

SUMMARY OF THE INVENTION

In accordance with the present invention, an improved preheat oxygen and cutting oxygen valve unit is provided which advantageously minimizes or avoids the foregoing and other disadvantages encountered in connection with preheat oxygen and cutting oxygen control valves in torches heretofore available. More particularly in this respect, the preheat oxygen and cutting oxygen valve unit in accordance with the present invention comprises coaxially interengaged preheat oxygen and cutting oxygen valves in the valve body of a cutting torch, each having corresponding open and closed conditions for connecting and disconnecting an oxygen inlet passage to the valve body with preheat oxygen and cutting oxygen outlet passages leading to the torch head. The valve actuators are in a common location relative to the valve body, thus to streamline the profile of the torch and to facilitate valve manipulation by both right and left handed persons using the torch. Moreover, the valve unit requires a single bore in the valve body, and the two valves of the unit are adapted to be preassembled and introduced into the bore, whereby both manufacturing and assembly time are reduced relative to torches requiring structurally separate preheat oxygen and cutting oxygen valves.

Preferably, the preheat oxygen valve is an annular valve supported in the bore of the valve body for rotation between open and closed positions, and the cutting oxygen valve is supported within the preheat oxygen valve for axial displacement relative thereto between open and closed positions. Axial displacement of the cutting oxygen valve is preferably achieved through a pivotal hand lever, and rotation of the preheat oxygen valve is preferably achieved by an operating knob thereon disposed beneath the hand lever, whereby the valve unit and valve operating components are structurally compact and readily assessable to the torch operator. In accordance with another aspect of the invention, the valve unit is axially slidably received in the bore in the valve body and is removably retained therein by a retaining clamp which interengages with the operating knob of the preheat oxygen valve to stop the latter in the open and closed positions thereof. When the hand lever is removed, the valve unit is readily and easily removed from the valve body by displacing the retaining clamp from engagement with the operating knob and then pulling the valve unit out of the bore in the valve body. When so removed, the component parts of the two valves are readily separable for performing maintenance and/or replacement operations with respect to each of the valves.

It is accordingly an outstanding object of the present invention to provide an improved preheat oxygen and cutting oxygen valve arrangement for a cutting torch.

Another object is the provision of a valve arrangement of the foregoing character wherein the preheat oxygen and cutting oxygen valves are combined to provide a single valve unit in which the valves are coaxially interengaged and operable through corresponding valve actuators.

Yet another object is the provision of a valve arrangement of the foregoing character which facilitates the ease of use of the torch by both right and left handed persons.

Still another object is the provision of a valve arrangement of the foregoing character which provides for a cutting torch to have a more streamlined profile than cutting torches heretofore available.

A further object is the provision of a valve arrangement of the foregoing character which is structurally simple and efficient in operation and which reduces manufacturing and assembly time and costs relative to cutting torches heretofore available.

Yet a further object is the provision of a valve arrangement of the foregoing character in which the valve unit is axially slidably received in a single bore in the valve body of the torch and wherein the actuator components for the preheat oxygen and cutting oxygen valves are in a common location relative to the valve body.

Still another object is the provision of a valve arrangement of the foregoing character in which the preheat oxygen valve is rotatable by a knob adjacent the exterior of the valve body and underlying a pivotal hand lever by which the valve element of the cutting oxygen valve is axially displaced relative to a seat therefor in the preheat oxygen valve.

Still another object is the provision of a valve arrangement of the foregoing character wherein the component parts of the preheat oxygen and cutting oxygen valves are adapted to be readily assembled and disassembled and which, when assembled, provide a valve unit adapted to be readily assembled and disassembled relative to the valve body of the torch, thus to optimize the ease and time of disassembly and assembly operations in connection with maintenance and/or replacement operations with respect to the two valves.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 1 is an elevation view, partially in section, of a gas burning torch incorporating a preheat oxygen and cutting oxygen valve arrangement in accordance with the present invention;

FIG. 4 is a plan view of the operating knob and retaining clamp for the valve unit taken along line 4—4 in FIG. 2.

DESCRIPTION OF A PREFERRED EMBODIMENT

Figure 2:
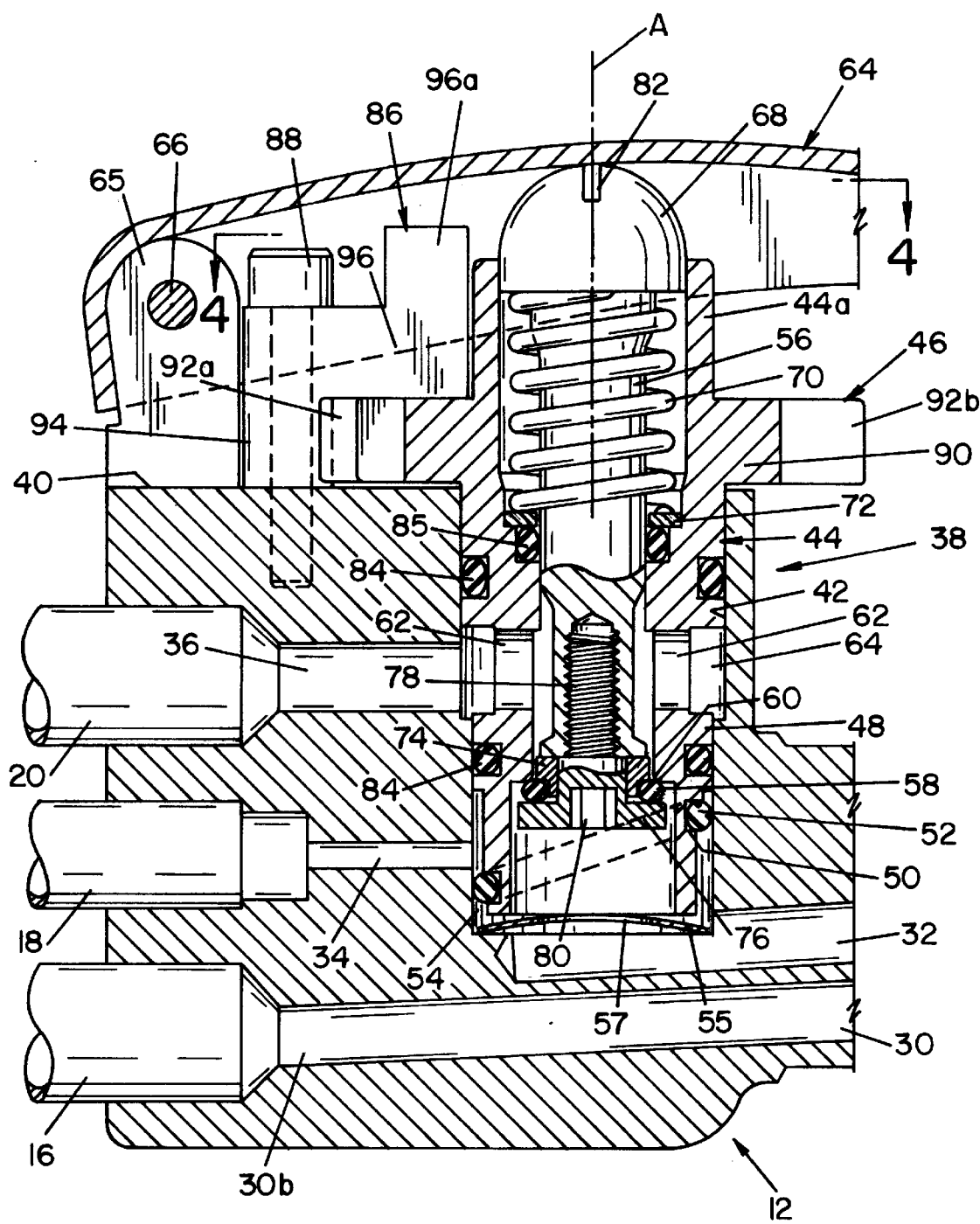
FIG. 2 is an enlarged sectional elevation view of the valve arrangement and showing the preheat oxygen and cutting oxygen valves in the closed positions thereof.

Referring now in greater detail to the drawings, wherein the showings are for the purpose of illustrating a preferred embodiment of the invention only and not for the purpose of limiting the invention, a gas burning torch 10 is illustrated in FIG. 1 which includes a valve body 12 and a torch head 14 connected to the valve body by a fuel gas supply tube 16, a preheat oxygen supply tube 18 and a cutting oxygen supply tube 20. The torch further includes a torch tip 22 removably mounted on the torch head and, in the embodiment illustrated, a preheat oxygen and fuel gas mixing insert 24 in head 14 between tip 22 and the outlet ends of supply tubes 16, 18 and 20. Valve body 12 includes coupling components 26 and 28 for connecting the torch to supplies of a fuel gas and oxygen, respectively, such as through a torch handle component, not shown, and a fuel gas passageway 30 having inlet and outlet ends 30a and 30b, respectively, for delivering fuel gas from the supply thereof to torch tip 22 through supply tube 16 and mixer 24. Valve body 12 further includes an oxygen inlet passageway 32 for receiving oxygen from the supply connected to the torch by means of coupling 28, and preheat oxygen and cutting oxygen outlet passages 34 and 36, respectively, for delivering oxygen from inlet passageway 32 to the corresponding one of the preheat oxygen and cutting oxygen supply tubes 18 and 20 under the control of a preheat oxygen and cutting oxygen valve unit 38 to be described in greater detail hereinafter. The flow of fuel gas from the supply to fuel gas passageway 30 is controlled by a manually operable valve, not shown, on the torch handle which is connected to the valve body by means of coupling 26.

Figure 3:
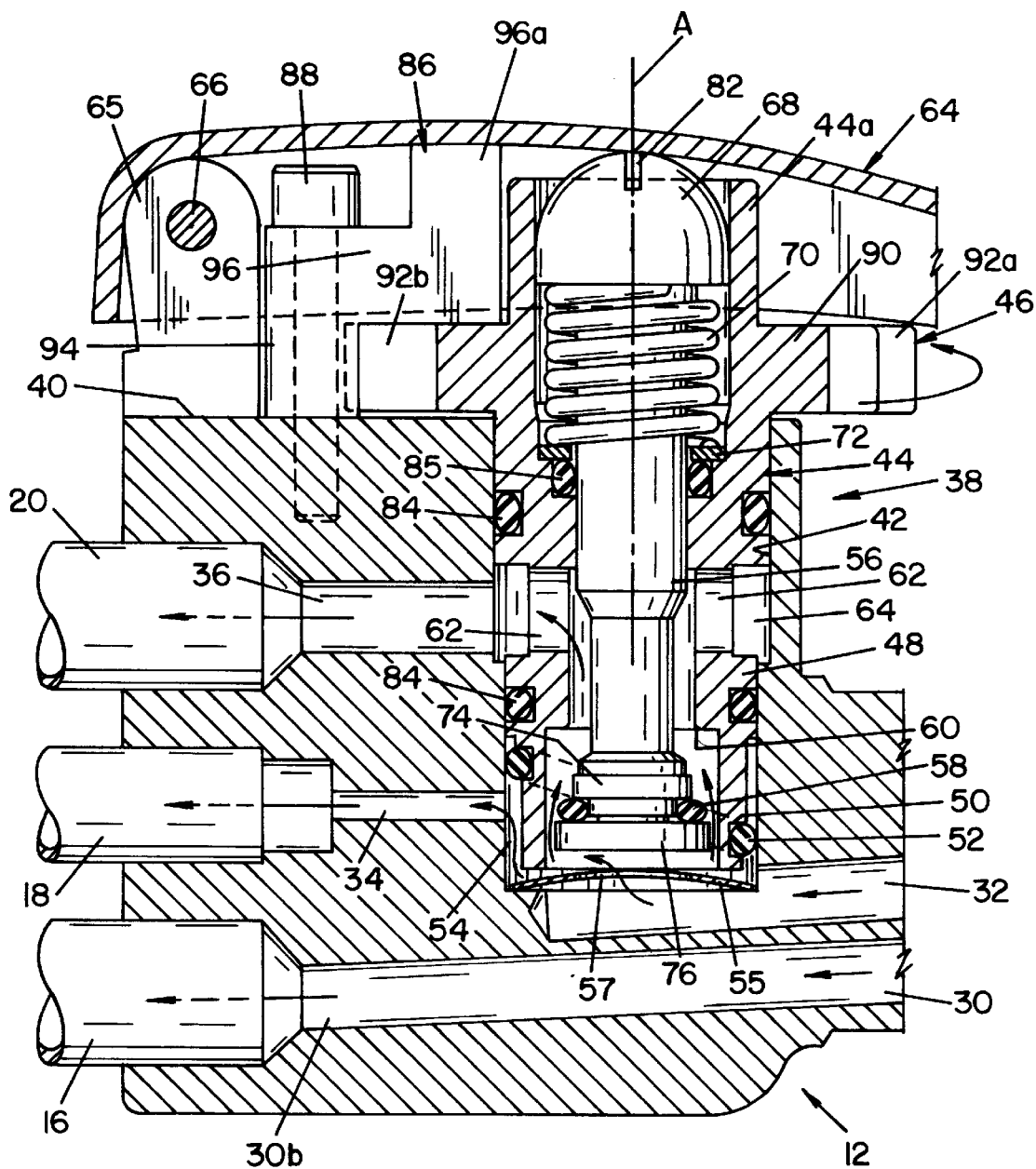
FIG. 3 is an enlarged sectional elevation view similar to FIG. 2 and showing the preheat oxygen and cutting oxygen valves in the open positions thereof.

Referring now to FIGS. 2 and 3 of the drawing, valve body 12 has an upper surface 40 and a circular bore 42 extending downwardly into the body from surface 40 and having an axis A. An annular preheat oxygen valve member 44 is received in bore 42 coaxial with axis A and has an axially outer end 44a provided outwardly adjacent surface 40 with a radially outwardly extending operating knob 46 by which valve member 44 is adapted to be rotated about axis A relative to bore 42. Oxygen inlet passageway 32 opens into the bottom of bore 42 and preheat oxygen and cutting oxygen outlet passages 34 and 36 open radially into bore 42 at locations axially spaced apart from one another and from fuel gas passageway 30. Preheat oxygen valve member 44 includes a cylindrical wall portion 48 at the axially inner end thereof having a helical or axially skewed recess 50 in the outer surface thereof which, as will be appreciated from FIGS. 2 and 3 of the drawing, extends axially across preheat oxygen outlet passage 34. The outer surface of wall portion 48 in the area of recess 50 is radially spaced from bore 42, and a resilient O-ring valve element 52 is received in recess 50 and sealingly engages between bore 42 and recess 50. The radial spacing between bore 42 and the axially innermost end of wall portion 48 provides an annular oxygen passage 54 between oxygen inlet 32 and valve element 52. Preferably, a wave spring 55 is provided in bore 42 at the axially inner end thereof for engaging the axially inner end of valve member 44 and biasing the valve member upwardly in bore 42 for the purpose set forth hereinafter. Spring 55 has an aperture 57 coaxial with axis A and providing a passage across the spring for communicating oxygen inlet 32 with oxygen passage 54 and the axially inner end of valve member 44.

When the component parts are in the positions thereof shown in FIG. 2, the preheat oxygen valve is closed and valve element 52 seals against the flow of oxygen from inlet passageway 32 to preheat oxygen outlet passage 34. By rotating preheat oxygen valve member 44 about 180° through the use of operating knob 46 to the position of the component parts shown in FIG. 3, the preheat oxygen valve is open whereby oxygen flows from inlet passageway 32 through spring aperture 57 to annular passage 54 and thence to preheat oxygen outlet passage 34. As will be further appreciated from FIGS. 2 and 3, rotation of preheat oxygen valve member 44 between the open and closed positions thereof provides for valve element 52 to progressively move across the entrance end of preheat oxygen outlet passage 34, thus to enable metering of the flow of oxygen to the preheat oxygen outlet passage.

The cutting oxygen valve is coaxially within and axially slidably interengaged with preheat oxygen valve member 44 and includes a valve stem member 56 having a resilient O-ring valve element 58 mounted on the axially inner end thereof as described more fully hereinafter. The radially inner surface of wall portion 48 of valve member 44 is radially outwardly stepped to provide a valve seat 60 having upstream and downstream sides with respect to the direction of flow of oxygen from inlet passageway 32 toward cutting oxygen outlet passage 36. Further, valve member 44 is provided with radially extending openings 62 and an annular manifold recess 63 on the downstream side of valve seat 60 and in axial alignment with cutting oxygen outlet passage 36. The cutting oxygen valve has a closed position as shown in FIG. 2 in which valve element 58 sealingly engages against the upstream side of valve seat 60 to disconnect flow communication between oxygen inlet passageway 32 and cutting oxygen outlet passage 36. As described hereinafter, valve stem 56 is displaceable axially inwardly of valve member 44 from the closed position shown in FIG. 2 to the open position shown in FIG. 3 in which valve element 58 is displaced in the upstream direction from valve seat 60 to provide flow communication between oxygen inlet passageway 32 and cutting oxygen outlet passage 36. The cutting oxygen valve is adapted to be displaced from the closed to the open position thereof by a pivotal hand lever 64 which is removably mounted on a post 65 on valve body 12 by means of a pin 66 which provides a pivot axis for the hand lever which is spaced from and transverse to axis A. The axially outer end of valve stem member 56 is provided with a head 68, and lever 64 extends from pin 66 across head 68, whereby clockwise displacement of the lever from the position thereof shown in FIG. 2 to the position shown in FIG. 3 displaces valve stem member 56 axially inwardly of preheat oxygen valve member 44 to open the cutting oxygen valve. A biasing spring 70 is provided within the axially outer end of valve member 44 between a spring backup ring 72 in valve member 44 and head 68 on the stem and biases the stem member axially outwardly relative to preheat to oxygen valve member 44 to the closed position of the cutting oxygen valve.

As best seen in FIG. 2, valve element 58 of the cutting oxygen valve is removably mounted on the axially inner end of valve stem member 56 by an L-shaped backup ring 74 and a retaining member having a head 76 which is cooperable with ring 74 to provide an annular recess receiving O-ring valve element 58. The retaining member includes a threaded shank 78 removably received in a threaded opening therefor in the axially inner end of valve stem member 56, and the outer end of head 76 is provided with an opening 80 for receiving a tool such as an allen wrench by which the retaining member can be rotated relative to stem member 56 for assembly and disassembly of the retaining member relative thereto. Preferably, the axially outer end of head 68 of the valve stem member is provided with a tool slot 82 for receiving a tool such as a screwdriver, whereby one of the valve stem member and retaining member can be held against rotation with the corresponding tool and the other rotated relative thereto to facilitate assembly and disassembly of the retaining member and valve stem member. The outer surface of preheat oxygen valve member 44 is provided on axially opposite sides of oxygen manifold 63 with peripheral recesses, not designated numerically, which receive O-ring sealing elements 84 which sealingly interengage with bore 42 to preclude the leakage of oxygen along the bore from manifold 63. Further, backup ring 72 and a recess in the inner surface of preheat oxygen valve member 44 cooperatively provide a recess receiving an O-ring sealing element 85 for sealing against the flow of oxygen axially across the upper end of valve stem member 56 when the cutting oxygen valve is open.

Preheat oxygen and cutting oxygen valve unit 38 is axially slidably received in bore 42 of valve body 12 and is removably retained therein by a retaining clamp 86 which is mounted on valve body 12 by means of a cap screw 88. As mentioned hereinabove, and as best seen in FIGS. 2–4, operating knob 46 of preheat oxygen valve member 44 extends radially outwardly of bore 42 axially outwardly adjacent outer surface 40 of valve body 12. Knob 46 includes a hub portion 90 and a plurality of ears 92 circumferentially spaced apart thereabout and extending radially outwardly therefrom. Retaining clamp 86 includes a leg 94 receiving cap screw 88 and a leg 96 extending radially inwardly of leg 94 in axially overlying relationship with the axially outer surface of operating knob 46, thus to axially retain valve unit 38 in bore 42. Wave spring 55 biases valve member 44 upwardly for operating knob 46 to engage against the underside of leg 96, thus for clamp 86 to axially position the valve member relative to bore 42, preheat oxygen outlet 34 and cutting oxygen outlet 36. Preferably, leg 96 of clamp 86 terminates in an upwardly extending stop 96a which underlies lever 64 to limit pivotal displacement of the lever in the direction to open the cutting oxygen valve. More particularly in this respect, as will be appreciated from FIG. 3, stop 96a precludes lever 64 from engaging axially outer end 44a of valve member 44 when the cutting oxygen valve is displaced to its open position by lever 64. This advantageously precludes the displacement of valve member 44 downwardly against the bias of wave spring 55 and which displacement could cause the valve member to shift sufficiently to change the preheat oxygen flow setting of valve element 52 relative to preheat oxygen outlet 34.

The axially outer end of cap screw 88 includes an opening 98 for a tool such as an allen wrench. When lever 64 is removed by removing pivot pin 66 from post 65, cap screw 88 can be tightened relative to valve body 12 to hold retaining clamp 86 in the position shown in FIG. 4 and can be removed from the valve body to permit removal of the retaining clamp to facilitate removal of valve unit 38 from bore 42. With further regard to operating knob 46 and retaining clamp 86, it will be noted that a diametrically opposite pair of the ears on the operating knob, designated 92a and 92b in the drawings, are radially longer than the other ears 92 so as to engage leg 94 of retaining clamp 86 in response to rotation of preheat oxygen valve member 44 in opposite directions about axis A. Such engagement of ears 92a and 92b with leg 94 stops rotation of the preheat oxygen valve relative to bore 42 in each of the fully open and closed positions of the valve. As will be appreciated from the foregoing description, when valve unit 38 is released and removed from valve body 12 the component parts of the preheat oxygen and cutting oxygen valves thereof are readily separable to facilitate maintenance and/or replacement operations with respect thereto.

It is believed that operation of the preheat oxygen and cutting oxygen valve unit will be understood from the foregoing description. In operation, the torch operator initiates the flow of fuel gas and preheat oxygen by manipulating the fuel gas valve, not shown, and by rotating preheat oxygen valve member 44 from the closed to an open position thereof by means of knob 46. Fuel gas and preheat oxygen flow to torch head 14 through supply tubes 16 and 18, respectively, and co-mingle in mixer 24 to provide a combustible mixture which flows through delivery passages 100 in mixer 24 and delivery passages 102 in torch tip 22 to the exit end of tip 22 where the combustible mixture is ignited to form a preheat flame for heating a workpiece to be cut. Following ignition, the operator can adjust the flow of fuel gas by manipulating the fuel gas valve and the flow of preheat oxygen by rotatably adjusting the position of the preheat oxygen valve so as to obtain a desired preheat flame. A workpiece is then heated to a temperature for cutting and, at the appropriate time, the torch operator depresses hand lever 64 to open the cutting oxygen valve whereupon oxygen flows from inlet passage 32 to cutting oxygen outlet passage 36 and thence to torch head 14 through cutting oxygen supply tube 20. From torch head 14, the cutting oxygen flows through mixer 24 and torch tip 22 separate from the flow of the combustible gas mixture therethrough and, more particularly, through cutting oxygen delivery passages 104 and 106 in mixer 24 and torch tip 22, respectively. Following the cutting operation, the torch operator releases lever 64 whereupon spring 70 biases the cutting oxygen valve to its closed position to stop the flow of cutting oxygen to the torch head, rotates operating knob 46 to rotate the preheat oxygen valve to its closed position and closes the fuel gas valve to stop the flow of fuel gas and preheat oxygen to the torch head.

While considerable emphasis has been placed herein on the structures and structural interrelationships between the component parts of the preferred embodiment of a combined preheat oxygen and cutting oxygen valve unit, it will be appreciated that other embodiments can be readily devised and that changes can be made in the preferred embodiment without departing from the principles of the invention. In this respect, for example, the valve for controlling the flow of fuel gas to the torch head could be provided on the valve body as opposed to the torch handle attached thereto as described herein, and arrangements other than retaining clamp 86 can be provided for releasably holding the valve unit against axial separation from bore 42 in the valve body. Likewise, arrangements other than interengagement between ears on the operating knob and the retaining clamp can be provided for stopping rotation of the preheat oxygen valve in its open and closed positions and, while positive stopping of the valve is preferred, it will be appreciated that the operating knob and valve body could be provided with visual indicators designating the open and closed positions of the preheat oxygen valve. Still further, valve element arrangements other than helically oriented O-ring valve element 52 can be provided for controlling the flow of oxygen to the preheat oxygen outlet in the valve body in response to rotation of the preheat oxygen valve member, and valve element arrangements other than the O-ring valve element on the axially inner end of the reciprocable cutting oxygen valve can be provided for controlling the flow of oxygen to the cutting oxygen outlet. The O-ring seals and valve elements are preferred in that they can be easily and inexpensively replaced and lend to reducing manufacturing costs and manufacturing and assembly time. The foregoing and other modifications of the preferred embodiment as well as other embodiments of the invention will be suggested or obvious to those skilled in the art from the disclosure herein, whereby it is to be distinctly understood that the foregoing descriptive matter is to be interpreted merely as illustrative of the present invention and not as a limitation.

Having thus described the invention, it is claimed:

1. In a gas torch comprising a torch head and a torch tip at said head, a valve body having a fuel gas inlet and an oxygen inlet, a preheat oxygen outlet, a cutting oxygen outlet and a preheat fuel gas outlet, valve means for controlling the flow of preheat fuel gas to said preheat fuel gas outlet and oxygen to said preheat oxygen outlet and said cutting oxygen outlet, and means for connecting said preheat fuel gas outlet, said preheat oxygen outlet and said cutting oxygen outlet with said torch head for a combustible mixture of said preheat fuel gas and said preheat oxygen to flow through said tip for ignition and for said cutting oxygen to flow through said tip separate from said combustible mixture, the improvement comprising: said valve means including relatively displaceable coaxially interengaging preheat oxygen and cutting oxygen valve means in said valve body between said oxygen inlet and said preheat oxygen and cutting oxygen outlets, said preheat oxygen valve means having open and closed conditions for respectively connecting and disconnecting said oxygen inlet with said preheat oxygen outlet, said cutting oxygen valve means having open and closed conditions respectively connecting and disconnecting said oxygen inlet with said cutting oxygen outlet, and operating means for displacing said preheat oxygen and said cutting oxygen valve means between said open and closed conditions thereof.

2. The improvement according to claim 1, wherein said operating means includes first and second operating means for respectively operating said preheat oxygen valve means and said cutting oxygen valves.

3. The improvement according to claim 1, wherein said preheat oxygen valve means is supported in said valve body for rotation relative thereto between the open and closed conditions of said preheat oxygen valve means.

4. The improvement according to claim 3, wherein said operating means includes knob means for rotating said preheat oxygen valve means between the open and closed conditions thereof.

5. The improvement according to claim 4, wherein said knob means and said valve body include interengaging means for stopping rotation of said preheat oxygen valve means in said open and closed conditions thereof.

6. The improvement according to claim 1, wherein said cutting oxygen valve means includes valve element means supported in said preheat oxygen valve means for axial reciprocation relative thereto between the open and closed conditions of said cutting oxygen valve means.

7. The improvement according to claim 6, wherein said operating means includes lever means for displacing said valve element means from the closed to the open condition of said cutting oxygen valve means, and spring means for biasing said valve element means from the open to the closed condition of said cutting oxygen valve means.

8. The improvement according to claim 7, and lever stop means for limiting displacement of said valve element means in the direction from the closed to the open condition of said cutting oxygen valve means.

9. The improvement according to claim 1, wherein said preheat oxygen valve means is supported in said valve body for rotation relative thereto between the open and closed conditions thereof and wherein said cutting oxygen valve means includes valve element means supported in said preheat oxygen valve means for axial reciprocation relative thereto between the open and closed conditions of said cutting oxygen valve means.

10. The improvement according to claim 9, wherein said operating means includes knob means for rotating said preheat oxygen valve means between the open and closed conditions thereof and lever means for displacing said valve element means from the closed to the open condition of said cutting oxygen valve means.

11. The improvement according to claim 10, wherein said knob means and said valve body include interengaging means for stopping rotation of said preheat oxygen valve means in said open and closed conditions thereof, and spring means for biasing said valve element means from the open to the closed condition of said cutting oxygen valve means.

12. The improvement according to claim 10, further including clamp means on said valve body overlying said knob means to retain said preheat oxygen valve means in said valve body, spring means biasing said preheat oxygen valve means in the direction to engage said knob means against said clamp means, and lever stop means for limiting displacement of said valve element means in the direction from the closed to the open condition of said cutting oxygen valve means.

13. The improvement accordingly to claim 12, wherein said clamp means and said knob means include interengaging means stopping rotation of said preheat oxygen valve means in said open and closed conditions thereof.

14. In a gas torch comprising a torch head and a torch tip on said head, a valve body having a fuel gas inlet and an oxygen inlet, a preheat oxygen outlet, a cutting oxygen outlet and a preheat fuel gas outlet, valve means for controlling the flow of preheat fuel gas to said preheat fuel gas outlet and oxygen to said preheat oxygen outlet and said cutting oxygen outlet, and means for connecting said preheat fuel gas outlet, said preheat oxygen outlet and said cutting oxygen outlet with said torch head for a combustible mixture of said preheat fuel gas and said preheat oxygen to flow through said tip for ignition and for said cutting oxygen to flow through said tip separate from said combustible mixture, the improvement comprising: said valve means including a bore in said valve body having an axis, said oxygen inlet opening into said bore, said preheat oxygen outlet and said cutting oxygen outlet opening into said bore at locations axially spaced from one another and from said oxygen inlet, annular preheat oxygen valve means in and coaxial with said bore and rotatably displaceable relative thereto between open and closed positions respectively connecting and disconnecting said oxygen inlet with said preheat oxygen outlet, cutting oxygen valve means in and coaxial with said annular preheat oxygen valve mean and including valve element means axially displaceable relative thereto between open and closed positions respectively connecting and disconnecting said oxygen inlet and said cutting oxygen outlet, means for rotating said preheat oxygen valve means between the open and closed positions thereof, and means for axially displacing said valve element means between the open and closed positions thereof.

15. The improvement according to claim 14, wherein said preheat oxygen valve means includes valve element means having axially spaced apart portions for sealingly interengaging with said bore on axially opposite sides of said preheat oxygen outlet.

16. The improvement according to claim 15, wherein said preheat oxygen valve means includes a cylindrical wall portion having a helical recess thereabout extending axially across said preheat oxygen outlet and said valve element means includes a resilient sealing element received in said recess.

17. The improvement according to claim 16, wherein said means for rotating said preheat oxygen valve means includes knob means overlying said valve body axially outwardly adjacent said bore.

18. The improvement according to claim 17, wherein said valve body and said knob means include interengaging stop means to stop rotation said preheat oxygen valve means in said open and closed positions thereof.

19. The improvement according to claim 14, wherein said preheat oxygen valve means includes valve seat means therein having upstream and downstream sides with respect to the direction of flow of oxygen from said oxygen inlet toward said cutting oxygen outlet, said valve element means including stem means and sealing means on said stem means for sealingly interengaging against said downstream side of said valve seat means in the closed position of said cutting oxygen valve means.

20. The improvement according to claim 19, wherein said means for displacing said valve element means includes spring means biasing said stem means in the direction to engage said sealing means against said seat means.

21. The improvement according to claim 20, wherein said means for displacing said valve element means includes pivotal lever means on said valve body for displacing said stem means in the direction to displace said sealing means away from said seat means.

22. The improvement according to claim 21, and lever stop means for limiting displacement of said stem means in said direction.

23. The improvement according to claim 14, wherein said preheat oxygen valve means includes a cylindrical wall portion having a helical recess extending externally thereabout and axially across said preheat oxygen outlet, a first sealing element in said recess sealingly interengaging with said bore, valve seat means extending internally about said wall portion and having upstream and downstream sides with respect to the direction of flow of oxygen from said oxygen inlet toward said cutting oxygen outlet, said valve element means including stem means and a second sealing element on said stem means sealingly engaging against said downstream side of said seat means in the closed position of said cutting oxygen valve means.

24. The improvement according to claim 23, wherein said bore in said valve body has an axially outer end and said preheat oxygen valve means has an axially outer end extending outwardly from said outer end of said bore, said means for rotating said preheat oxygen valve means including a knob extending radially outwardly from said outer end of said preheat oxygen valve means and axially overlying said valve body.

25. The improvement according to claim 24, wherein said preheat oxygen valve means is axially slidably received in said bore, and retaining means on said valve body overlying said knob for releasably holding said preheat oxygen valve means in said bore.

26. The improvement according to claim 25, and spring means in said bore biasing said preheat oxygen valve means to engage said knob against said retaining means.

27. The improvement according to claim 26, wherein said retaining means and said knob include means interengaging to stop rotation of said preheat oxygen valve means in each of said open and closed positions thereof.

28. The improvement according to claim 23, wherein said bore in said valve body has an axially outer end and said stem means has an axially outer end extending outwardly form said outer end of said bore, said means for axially displacing said valve element means including a lever mounted on said valve body for pivotal displacement about a lever axis spaced from and transverse to the axis of said bore and interengaging with said outer end of said stem means.

29. The improvement according to claim 28, and spring means between said preheat oxygen valve means and said outer end of said stem means biasing said stem means axially outwardly of said preheat oxygen valve means.

30. The improvement according to claim 29, and lever stop means for limiting displacement of said stem means axially inwardly of said preheat oxygen valve means.

31. The improvement according to claim 23, wherein said bore in said valve body has an axially outer end and said preheat oxygen valve means has an axially outer end extending outwardly from said outer end of said bore, said means for rotating said preheat oxygen valve means including a knob extending radially outwardly from said outer end of said preheat oxygen valve means and axially overlying said valve body, said stem means having an axially outer end extending outwardly from said outer end of said preheat oxygen valve means, and said means for axially displacing said valve element means including a lever mounted on said valve body for pivotal displacement about a lever axis spaced from and transverse to the axis of said bore and interengaging with said outer end of said stem means.

32. The improvement according to claim 31, and spring means between said preheat oxygen valve means and said outer end of said stem means biasing said stem means axially outwardly of said preheat oxygen valve means.

33. The improvement according to claim 32, wherein said preheat oxygen valve means is axially slidably received in said bore, and retaining means on said valve body overlying said knob for releasably holding said preheat oxygen valve means in said bore.

34. The improvement according to claim 33, further including spring means in said bore biasing said preheated oxygen valve means to engage said knob against said retaining means, and lever stop means on said retaining means for limiting displacement of said stem means axially inwardly of said preheat oxygen valve means.

35. The improvement according to claim 34, wherein said retaining means and said knob include means interengaging to stop rotation of said preheat oxygen valve means in each of said open and closed positions thereof.

* * * * *